United States Patent
Li et al.

(10) Patent No.: US 12,554,673 B2
(45) Date of Patent: Feb. 17, 2026

(54) DATA TRANSMISSION METHOD, DATA PROCESSING METHOD, AND RELATED PRODUCT

(71) Applicant: Huawei Technologies Co., Ltd., Shenzhen (CN)

(72) Inventors: Xiaofeng Li, Shenzhen (CN); Pei Wu, Hangzhou (CN); Rui Yang, Chengdu (CN); Pinsheng Li, Hangzhou (CN); Xiubin Mao, Hangzhou (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 131 days.

(21) Appl. No.: 18/496,234

(22) Filed: Oct. 27, 2023

(65) Prior Publication Data

US 2024/0061802 A1 Feb. 22, 2024

Related U.S. Application Data

(63) Continuation of application No. PCT/CN2022/089705, filed on Apr. 28, 2022.

(30) Foreign Application Priority Data

Apr. 30, 2021 (CN) .......................... 202110486548.1
Jun. 28, 2021 (CN) .......................... 202110720639.7

(51) Int. Cl.
*G06F 15/173* (2006.01)
*G06F 9/50* (2006.01)
(Continued)

(52) U.S. Cl.
CPC ........ *G06F 15/17331* (2013.01); *G06F 13/28* (2013.01); *G06F 13/38* (2013.01)

(58) Field of Classification Search
CPC .................................. G06F 3/0659; H04L 1/00
See application file for complete search history.

(56) References Cited

U.S. PATENT DOCUMENTS 8,416,709 B1 * 4/2013 Marshall ............. H04L 41/0806
370/252
9,935,830 B1 * 4/2018 Mahapatra .......... H04L 41/0816
(Continued)

FOREIGN PATENT DOCUMENTS

CN 110392084 A 10/2019

*Primary Examiner* — Getente A Yimer
(74) *Attorney, Agent, or Firm* — Conley Rose, P.C.

(57) ABSTRACT

A computer system includes a first computing node and a second computing node. The first computing node includes a first device and a first memory. The second computing node includes a second device and a second memory. The first memory includes a first memory space. The second memory includes a second memory space. The first device obtains a cross-node read instruction. The cross-node read instruction includes a virtual address of the second memory space and a size of first data. The first device determines an identifier (ID) of the second computing node based on the virtual address of the second memory space and a first correspondence, to obtain a first network transmission packet, and sends the packet to the second device. The second device receives the packet, reads the first data from the second memory space, and sends the first data to the first device.

20 Claims, 8 Drawing Sheets

(51) Int. Cl.
*G06F 12/06* (2006.01)
*G06F 13/28* (2006.01)
*G06F 13/38* (2006.01)

(56) References Cited

U.S. PATENT DOCUMENTS

| | | | |
|---|---|---|---|
| 11,528,334 B2 * | 12/2022 | Krishan | H04L 45/74 |
| 11,888,957 B2 * | 1/2024 | Krishan | H04L 67/61 |
| 2016/0070475 A1 | 3/2016 | Zhang et al. | |
| 2018/0239726 A1 | 8/2018 | Wang et al. | |
| 2019/0065083 A1 | 2/2019 | Sen et al. | |
| 2019/0213029 A1 | 7/2019 | Liu et al. | |
| 2019/0342229 A1 * | 11/2019 | Khinvasara | H04L 41/0896 |
| 2024/0168611 A1 * | 5/2024 | Pham | G06F 18/23213 |

* cited by examiner

| Byte 7 | Byte 6 | Byte 5 | Byte 4 | Byte 3 | Byte 2 | Byte 1 | Byte 0 | Byte |
|---|---|---|---|---|---|---|---|---|
| First source address | | | | | | | | 0 |
| First destination address | | | | | | | | 8 |
| | | | Size of first data | | | | | 16 |
| | | | | | | | | 24 |
| | | | ... | | | | | 32 |
| | | | | | | | | 40 |
| | | | | | | | | 48 |
| | | | | | | | | 56 |
| | | | | | | | | 64 |

Second correspondence

| Computing node ID | Acceleration device ID | Acceleration function ID |
|---|---|---|
| 1 | 1 | 1 |
| 1 | 1 | 2 |
| 2 | 2 | 1 |
| 2 | 2 | 3 |

FIG. 7

| Byte 7 | Byte 6 | Byte 5 | Byte 4 | Byte 3 | Byte 2 | Byte 1 | Byte 0 | Byte |
|---|---|---|---|---|---|---|---|---|
| Third source address ||||||||  0 |
| Third destination address |||||||| 8 |
| Address of a third storage space |||||||| 16 |
| Target acceleration function ID |||| Target acceleration device ID |||| 24 |
| Size of third data |||||||| 32 |
| ... |||||||| 40 |
| ^ |||||||| 48 |
| ^ |||||||| 56 |
| ^ |||||||| 64 |

FIG. 9

DATA TRANSMISSION METHOD, DATA PROCESSING METHOD, AND RELATED PRODUCT

CROSS-REFERENCE TO RELATED APPLICATIONS

This application is a continuation of International Patent Application No. PCT/CN2022/089705 filed on Apr. 28, 2022, which claims priority to Chinese Patent Application No. 202110486548.1 filed on Apr. 30, 2021 and Chinese Patent Application No. 202110720639.7 filed on Jun. 28, 2021. All of the aforementioned patent applications are hereby incorporated by reference in their entireties.

TECHNICAL FIELD

The present disclosure relates to the field of computer technologies, and in particular, to a data transmission method, a data processing method, and a related product.

BACKGROUND

With rapid development of technologies such as artificial intelligence and cloud computing, computer clusters are more widely applied. A computer cluster is a computer system including a group of independent computers using a high-speed communication network. When a computer cluster processes a burst service, the following case may occur: some computing nodes in the cluster are overloaded, and some computing nodes have excessive resources. This affects processing progress of the service.

SUMMARY

The present disclosure provides a data transmission method, a data processing method, and a related product, to implement cross-computing-node resource sharing in a computer cluster.

According to a first aspect, the present disclosure provides a data transmission method, applied to a computer system, where the computer system includes a first computing node and a second computing node, the first computing node includes a first device and a first memory, the second computing node includes a second device and a second memory, the first memory includes a first memory space, and the second memory includes a second memory space; and the method includes the following steps:

The first device obtains a cross-node read instruction, where the cross-node read instruction instructs the first device to read first data from the second memory space, the cross-node read instruction includes a first source address and a size of the first data, the first source address is a virtual address of the second memory space, the first device stores a first correspondence, and the first correspondence includes a correspondence between the virtual address of the second memory space and an identifier (ID) of the second computing node; the first device determines the ID of the second computing node based on the virtual address of the second memory space and the first correspondence; the first device obtains a first network transmission packet according to the ID of the second computing node and the cross-node read instruction, and sends the first network transmission packet to the second device, where the first network transmission packet includes the virtual address of the second memory space and the size of the first data; and the second device receives the first network transmission packet, reads the first data from the second memory space, and sends the first data to the first device.

According to the method described in the first aspect, the first device may read the first data from the memory (namely, the second memory space) of the second computing node, to implement cross-computing-node data transmission, and implement cross-computing-node memory resource sharing. In addition, the first device stores the first correspondence, and the first device may obtain, based on the first correspondence, the first network transmission packet, and send the first network transmission packet to the second device. In this process, a central processing unit (CPU) and an operating system of the first computing node may be bypassed. Therefore, the foregoing method can further improve cross-computing-node data transmission efficiency.

In a possible implementation, the computing nodes in the computer system share a resource in a memory resource pool, and the memory resource pool includes the first memory and the second memory. The memory resource pool is established, so that any computing node in the computer system may use a memory resource of another computing node, to resolve a problem that task execution progress is affected because a memory configuration of a single computing node does not satisfy an actual requirement.

In a possible implementation, the first computing node further includes a first processor, and the method further includes: the first processor addresses an address space of the memory resource pool, to obtain a global virtual address of the memory resource pool; and the first computing node accesses a storage space of the memory resource pool by using the global virtual address. In this way, any computing node in the computer system may obtain an address of a memory space of another computing node to use a memory resource of the other computing node.

In a possible implementation, that the first device obtains a cross-node read instruction includes: The first processor obtains, from the memory resource pool, a virtual address of the first memory space and the virtual address of the second memory space that correspond to the first data, and generates the cross-node read instruction; and the first processor sends the cross-node read instruction to the first device. In another possible implementation, that the first device obtains a cross-node read instruction includes: The first device obtains, from the memory resource pool, a virtual address of the first memory space and the virtual address of the second memory space that correspond to the first data, and generates the cross-node read instruction. It can be learned that the cross-node read instruction may be generated by the first processor, or may be generated by the first device. When the first processor is overloaded or the first processor needs to preferentially process another task, the first device may generate the cross-node read instruction, without waiting for the first processor to generate the cross-node read instruction, to improve efficiency of reading the first data from the second memory space by the first device.

In a possible implementation, the cross-node read instruction further includes a first destination address, and the first destination address is the virtual address of the first memory space; and the method further includes: The first device receives the first data; and the first device writes the first data into the first memory space based on the virtual address of the first memory space. In this way, the first device may write the data read from the second memory space into the first memory space.

In a possible implementation, the first correspondence includes a correspondence between the global virtual address of the memory resource pool, a physical address of the storage space of the memory resource pool, and an ID of each computing node associated with the memory resource pool, and that the first device writes the first data into the first memory space based on the virtual address of the first memory space includes: The first device determines a physical address of the first memory space based on the first correspondence and the virtual address of the first memory space; and the first device writes the first data into the first memory space in a direct memory access (DMA) manner. In this way, a speed at which the first device writes the first data into the first memory space can be improved.

In a possible implementation, the second device stores the first correspondence, and that the second device receives the first network transmission packet, and reads the first data from the second memory space includes: The second device receives the first network transmission packet, and obtains the virtual address of the second memory space; then determines a physical address of the second memory space based on the first correspondence and the virtual address of the second memory space; and reads the first data from the second memory space in the DMA manner. In this way, a speed at which the second device reads the first data from the second memory space can be improved. In addition, the second device stores the first correspondence, so that the second device can determine the physical address of the second memory space based on the first correspondence, to read the first data from the second memory space. In this process, a CPU and an operating system of the second computing node are bypassed. Therefore, the foregoing method can further improve the cross-computing-node data transmission efficiency.

In a possible implementation, the first memory further includes a third memory space, and the second memory further includes a fourth memory space; and the method further includes: The first device obtains a cross-node write instruction, where the cross-node write instruction instructs the first device to write second data into the third memory space, the cross-node write instruction includes a second source address, a second destination address, and a size of the second data, the second source address is a virtual address of the third memory space, and the second destination address is a virtual address of the fourth memory space; the first device determines a physical address of the third memory space based on the first correspondence and the virtual address of the third memory space; the first device reads the second data from the third memory space in the DMA manner; the first device determines the ID of the second computing node based on the first correspondence and the virtual address of the fourth memory space; the first device obtains a second network transmission packet according to the ID of the second computing node and the cross-node write instruction, and sends the second network transmission packet to the second device, where the second network transmission packet includes the virtual address of the fourth memory space and the second data; and the second device receives the second network transmission packet, and writes the second data into the fourth memory space.

According to the method described in the foregoing implementation, the first device may write the second data into the memory (namely, the fourth memory space) of the second computing node, to implement the cross-computing-node data transmission, and implement the cross-computing-node memory resource sharing. In addition, the first device stores the first correspondence, and the first device may obtain the second data based on the first correspondence, and send the second data to the second device. In this process, the CPU and the operating system of the first computing node are bypassed. Therefore, the foregoing method can improve the cross-computing-node data transmission efficiency.

According to a second aspect, the present disclosure provides a data processing method, applied to a computer system, where the computer system includes a first computing node and a second computing node, the first computing node includes a first device, and the second computing node includes a second device; and the method includes: The first device obtains a cross-node acceleration instruction, where the cross-node acceleration instruction instructs the first device to use the second device to process third data, the cross-node read instruction includes an ID of the second device and an ID of a target acceleration function, the first device stores a second correspondence, and the second correspondence includes a correspondence between the ID of the second device and an ID of the second computing node; the first device determines the ID of the second computing node based on the ID of the second device and the second correspondence; the first device obtains a third network transmission packet according to the ID of the second computing node and the cross-node acceleration instruction, and sends the third network transmission packet to the second device, where the third network transmission packet includes the ID of the target acceleration function; the second device performs corresponding processing on the third data based on the ID of the target acceleration function; and the second device sends a processing result of the third data to the first computing node.

According to the method described in the second aspect, the first device may use the second device in the second computing node to process the third data, to implement cross-computing-node data processing, so as to implement cross-computing-node computing resource sharing. In addition, the first device stores the second correspondence, and the first device may obtain, based on the second correspondence, the third network transmission packet, and send the third network transmission packet to the second device. In this process, a CPU and an operating system of the first computing node may be bypassed. Therefore, the foregoing method can further improve cross-computing-node data processing efficiency.

In a possible implementation, the computing nodes in the computer system share a resource in a computing resource pool, and the computing resource pool includes the second device. The computing resource pool is established, so that any computing node in the computer system may use a computing resource of another computing node. Therefore, global load balancing can be implemented in the foregoing computer system, and task processing efficiency can be improved.

In a possible implementation, the first computing node further includes a first processor, and the method further includes: The first processor numbers acceleration devices in the computing resource pool and an acceleration function of each acceleration device, to obtain IDs of the plurality of acceleration devices and an ID of an acceleration function corresponding to the ID of each acceleration device; and the first computing node processes, by using the IDs of the plurality of acceleration devices and the ID of the acceleration function corresponding to the ID of each acceleration device, the third data by using the acceleration device in the computing resource pool. In this way, any computing node in the computer system may obtain information about a computing resource of another computing node to use the computing resource of the other computing node.

In a possible implementation, that the first device obtains a cross-node acceleration instruction includes: The first processor obtains, from the computing resource pool, the ID of the second device and the ID of the target acceleration function that correspond to the third data, and generates the cross-node acceleration instruction; and sends the cross-node acceleration instruction to the first device. In another possible implementation, that the first device obtains a cross-node acceleration instruction includes: The first device obtains, from the computing resource pool, the ID of the second device and the ID of the target acceleration function that correspond to the third data, and generates the cross-node acceleration instruction. It can be learned that the cross-node acceleration instruction may be generated by the first processor, or may be generated by the first device. When the first processor is overloaded or the first processor needs to preferentially process another task, the first device may generate the cross-node acceleration instruction, without waiting for the first processor to generate the cross-node acceleration instruction, to improve data processing efficiency.

In a possible implementation, the cross-node acceleration instruction further includes a third source address and a third destination address, the third source address is an address of a device storage space in which the third data is stored, and the third destination address is an address of a device storage space into which the processing result of the third data is written.

In a possible implementation, the third source address is an address of a storage space of the first device, and before the second device performs corresponding processing on third data based on the ID of the target acceleration function, the method further includes: The first device obtains the third source address according to the cross-node acceleration instruction; and the first device reads the third data from the storage space of the first device, and sends the third data to the second device.

In another possible implementation, the third source address is an address of a storage space of the second device, the third network transmission packet further includes the third source address, and before the second device performs corresponding processing on third data based on the ID of the target acceleration function, the method further includes: The second device obtains the third source address based on the third network transmission packet; and the second device reads the third data from the storage space of the second device.

It can be learned that the third data may be stored in the device storage space of the first device, or may be stored in the device storage space of the second device. The data processing method provided in the present disclosure can process the third data using the second device.

According to a third aspect, the present disclosure provides a computer system. The computer system includes a first computing node and a second computing node, the first computing node includes a first device and a first memory, the second computing node includes a second device and a second memory, the first memory includes a first memory space, and the second memory includes a second memory space, where the first device is configured to obtain a cross-node read instruction, where the cross-node read instruction includes a first source address and a size of first data, the first source address is a virtual address of the second memory space, the first device stores a first correspondence, and the first correspondence includes a correspondence between the virtual address of the second memory space and an ID of the second computing node; the first device is further configured to determine the ID of the second computing node based on the virtual address of the second memory space and the first correspondence; the first device is further configured to: obtain a first network transmission packet according to the ID of the second computing node and the cross-node read instruction, and send the first network transmission packet to the second device, where the first network transmission packet includes the virtual address of the second memory space and the size of the first data; and the second device is configured to: receive the first network transmission packet, read the first data from the second memory space, and send the first data to the first device.

In a possible implementation, the computing nodes in the computer system share a resource in a memory resource pool, and the memory resource pool includes the first memory and the second memory.

In a possible implementation, the first computing node further includes a first processor, where the first processor is configured to address an address space of the memory resource pool, to obtain a global virtual address of the memory resource pool; and the first computing node is configured to access a storage space of the memory resource pool by using the global virtual address.

In a possible implementation, the first processor is further configured to: obtain, from the memory resource pool, a virtual address of the first memory space and the virtual address of the second memory space that correspond to the first data, and generate the cross-node read instruction; and the first processor is further configured to send the cross-node read instruction to the first device.

In a possible implementation, the first device is further configured to: obtain, from the memory resource pool, a virtual address of the first memory space and the virtual address of the second memory space that correspond to the first data, and generate the cross-node read instruction.

In a possible implementation, the cross-node read instruction further includes a first destination address, and the first destination address is the virtual address of the first memory space; the first device is further configured to receive the first data; and the first device is further configured to write the first data into the first memory space based on the virtual address of the first memory space.

In a possible implementation, the first correspondence includes a correspondence between the global virtual address of the memory resource pool, a physical address of the storage space of the memory resource pool, and an ID of each computing node associated with the memory resource pool, and the first device is further configured to: determine a physical address of the first memory space based on the first correspondence and the virtual address of the first memory space, and then write the first data into the first memory space in a DMA manner.

In a possible implementation, the second device stores the first correspondence, and the second device is further configured to: receive the first network transmission packet, and obtain the virtual address of the second memory space; then determine a physical address of the second memory space based on the first correspondence and the virtual address of the second memory space; and read the first data from the second memory space in the DMA manner.

In a possible implementation, the first memory further includes a third memory space, and the second memory further includes a fourth memory space; and the first device is further configured to: obtain a cross-node write instruction, where the cross-node write instruction instructs the first device to write second data into the fourth memory space, the cross-node write instruction includes a second source address, a second destination address, and a size of the second data, the second source address is a virtual address of the third memory space, and the second destination address is a virtual address of the fourth memory space; the first device is further configured to determine a physical address of the third memory space based on the first correspondence and the virtual address of the third memory space; the first device is further configured to read the second data from the third memory space in the DMA manner; the first device is further configured to determine the ID of the second computing node based on the first correspondence and the virtual address of the fourth memory space; the first device is further configured to: obtain a second network transmission packet according to the ID of the second computing node and the cross-node write instruction, and send the second network transmission packet to the second device, where the second network transmission packet includes the virtual address of the fourth memory space and the second data; and the second device is further configured to: receive the second network transmission packet, and write the second data into the fourth memory space.

According to a fourth aspect, the present disclosure further provides a computer system. The computer system includes a first computing node and a second computing node, the first computing node includes a first device, and the second computing node includes a second device, where the first device is configured to obtain a cross-node acceleration instruction, where the cross-node acceleration instruction instructs the first device to use the second device to process third data, the cross-node acceleration instruction includes an ID of the second device and an ID of a target acceleration function, the first device stores a second correspondence, and the second correspondence includes a correspondence between the ID of the second device and an ID of the second computing node; the first device is further configured to determine the ID of the second computing node based on the ID of the second device and the second correspondence; the first device is further configured to: obtain a third network transmission packet according to the ID of the second computing node and the cross-node acceleration instruction, and send the third network transmission packet to the second device, where the third network transmission packet includes the ID of the target acceleration function; the second device is further configured to perform corresponding processing on the third data based on the ID of the target acceleration function; and the second device is configured to send a processing result of the third data to the first computing node.

In a possible implementation, the computing nodes in the computer system share a resource in a computing resource pool, and the computing resource pool includes the second device.

In a possible implementation, the first computing node further includes a first processor, where the first processor is configured to number acceleration devices in the computing resource pool and an acceleration function of each acceleration device, to obtain IDs of the plurality of acceleration devices and an ID of an acceleration function corresponding to the ID of each acceleration device; and the first computing node is configured to process, by using the IDs of the plurality of acceleration devices and the ID of the acceleration function corresponding to the ID of each acceleration device, the third data by using the acceleration device in the computing resource pool.

In a possible implementation, the first processor is further configured to: obtain, from the computing resource pool, the ID of the second device and the ID of the target acceleration function that correspond to the third data, and generate the cross-node acceleration instruction; and the first processor is further configured to send the cross-node acceleration instruction to the first device.

In a possible implementation, the first device is further configured to: obtain, from the computing resource pool, the ID of the second device and the ID of the target acceleration function that correspond to the third data, and generate the cross-node acceleration instruction.

In a possible implementation, the cross-node acceleration instruction further includes a third source address and a third destination address, the third source address is an address of a device storage space in which the third data is stored, and the third destination address is an address of a device storage space into which the processing result of the third data is written.

In a possible implementation, the third source address is an address of a storage space of the first device, and the first device is further configured to: obtain the third source address according to the cross-node acceleration instruction; read the third data from the storage space of the first device; and send the third data to the second device.

In a possible implementation, the third source address is an address of a storage space of the second device, the third network transmission packet further includes the third source address, and the second device is further configured to: obtain the third source address based on the third network transmission packet; and read the third data from the storage space of the second device.

According to a fifth aspect, the present disclosure provides a computer-readable storage medium, storing a first computer instruction and a second computer instruction, where the first computer instruction and the second computing instruction respectively run on a first computing node and a second computing node, to perform the method in any one of the first aspect or the possible implementations of the first aspect, or any one of the second aspect or the possible implementations of the second aspect, so as to implement data processing between the first computing node and the second computing node.

BRIEF DESCRIPTION OF DRAWINGS

FIG. 7 is a schematic diagram of a second correspondence according to the present disclosure;

FIG. 9 is a schematic diagram of a format of a cross-node acceleration instruction according to the present disclosure.

DESCRIPTION OF EMBODIMENTS

Figure 1:
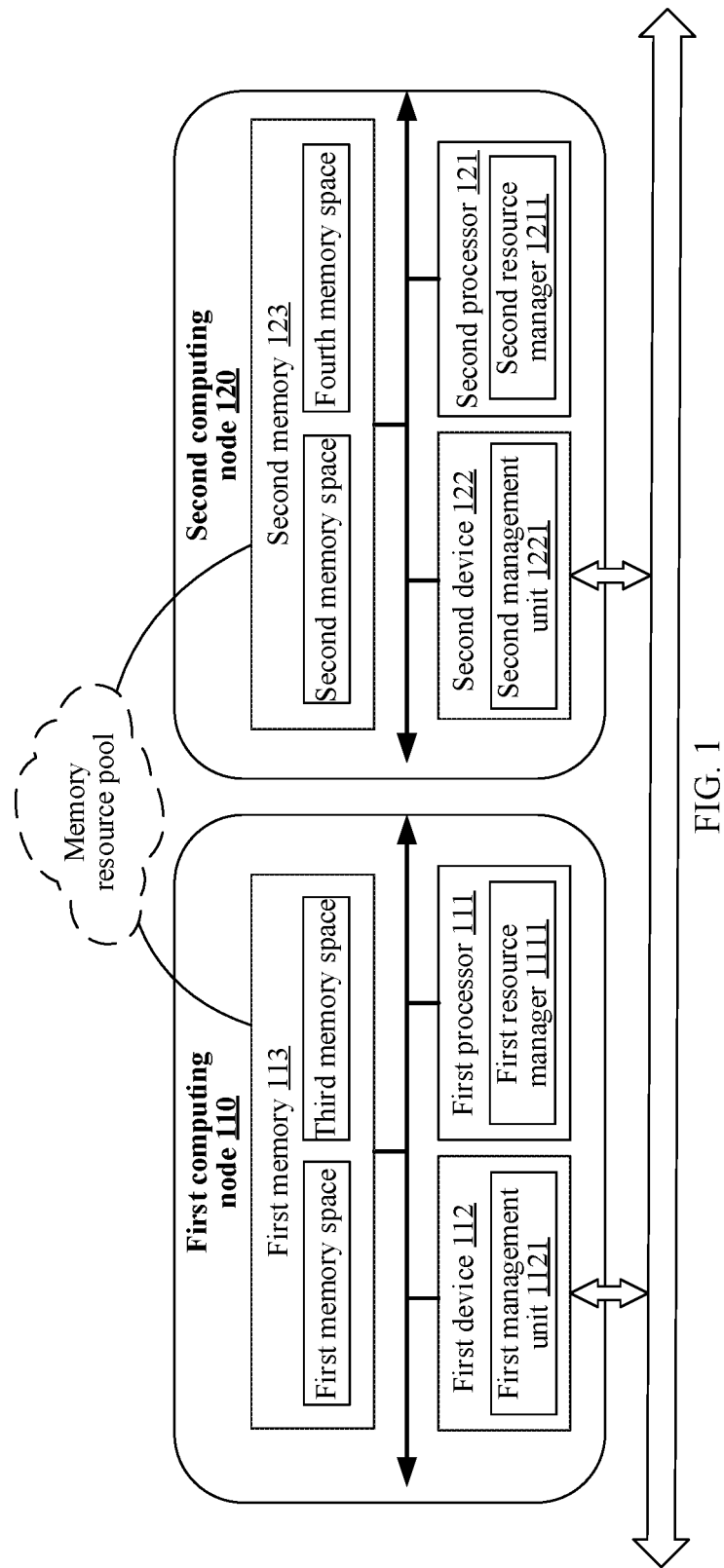
FIG. 1 is a schematic diagram of a structure of a computer system according to the present disclosure.

To facilitate understanding of technical solutions provided in the present disclosure, an application scenario to which the present disclosure is applicable is first described: resource sharing of a computer system (for example, a cluster).

In the present disclosure, a computer system includes two or more computing nodes (namely, computers), and resources of the computer system includes two aspects: memory resources, to be specific, memory resources owned by all the computing nodes in the system; and computing resources, to be specific, computing resources owned by all the computing nodes in the system. Resource sharing of the computer system includes memory resource sharing of the system and computing resource sharing of the system.

The memory resource sharing of the computer system aims to construct a memory resource pool. In this way, when a memory resource of a computing node in the computer system is insufficient, the computing node may use a memory of another computing node as a disk or a cache to store some data. When the computing node needs to use the data, the computing node reads the data from the memory of another computing node, to resolve a problem that task execution progress is affected because a memory configuration of a single computing node does not satisfy an actual requirement.

The computing resource sharing of the computer system aims to construct a computing resource pool. In this way, when a computing node in the computer system is overloaded, the computing node may use computing power of another computing node to process a part of tasks that need to be completed by the computing node, to implement global load balancing within a range of the computer system, so as to accelerate task completion progress. In embodiments of the present disclosure, the computing resource sharing of the computer system is specifically acceleration resource sharing of the computer system. An acceleration resource is an acceleration computing capability, and may be provided by an acceleration device. The acceleration device is hardware that can reduce workload of a CPU in a computing node and improve task processing efficiency of the computing node, for example, a graphics processing unit (GPU) specially configured to perform computing work related to images and graphics, a neural network processing unit (NPU) specially configured to process massive video and image multimedia data, or a data stream accelerator (DSA). Therefore, the acceleration resource sharing of the computer system may be understood as that when an acceleration device on a computing node in the computer system is overloaded, some computing tasks may be allocated to an acceleration device on another computing node in the system for execution, to reduce workload of a CPU and the acceleration device of the computing node, and improve computing task completion efficiency.

The present disclosure provides a data transmission method. The method may be performed by a computer system. When the method is performed in the computer system, cross-computing-node data transmission can be implemented, so as to implement memory resource sharing in the system. The following describes the data transmission method provided in the present disclosure with reference to a computer system shown in FIG. 1.

FIG. 1 is a schematic diagram of a structure of the computer system according to the present disclosure. The computer system 100 includes a first computing node 110 and a second computing node 120. The first computing node 110 includes a first processor 111, a first device 112, and a first memory 113. The first processor 111 includes a first resource manager 1111. The first device 112 includes a first management unit 1121. The second computing node 120 includes a second processor 121, a second device 122, and a second memory 123. The second processor 121 includes a second resource manager 1211, and the second device 122 includes a second management unit 1221.

First Computing Node 110:

The first processor 111 may include a CPU, or may include an application-specific integrated circuit (ASIC) or a programmable logic device (PLD). The PLD may be a complex programmable logic device (CPLD), a field programmable logic gate array (FPGA), a generic array logic (GAL), or any combination thereof.

The first device 112 is an external device on the first computing node 110. The first device 112 may be a GPU, an NPU, a DSA, a tensor processing unit (TPU), an artificial intelligence chip, a network adapter, a data processing unit (DPU), or one or more integrated circuits.

Optionally, the first processor 111 and the first device 112 may be connected through a peripheral component interconnect express (PCIe) bus, or may be connected through a compute express link (CXL). The first processor 111 and the first device 112 may alternatively be connected through another bus, for example, a peripheral component interconnect (PCI) bus or a universal serial bus (USB). This is not specifically limited herein.

The first memory 113 is a memory in the first computing node 110, and is configured to: store data in a CPU of the first computing node 110, and exchange data with an external storage (for example, a storage of the first device 112) on the first computing node 110.

The first resource manager 1111 is a component that is in the first computing node 110 and that manages memory resources owned by all the computing nodes in the computer system 100. Specifically, the first resource manager 1111 is configured to construct a memory resource pool, where the memory resource pool includes the first memory 113 and the second memory 123. The first resource manager 1111 is further configured to address an address space of the memory resource pool, to obtain a global virtual address of the memory resource pool. The first resource manager 1111 is further configured to: construct a first correspondence, and configure the first correspondence in the first management unit 1121. The first correspondence is a correspondence between the global virtual address, a physical address of a storage space of the memory resource pool, and an ID of each computing node associated with the memory resource pool (namely, an ID of a computing node that provides the storage space).

In this embodiment of the present disclosure, that the first resource manager 1111 addresses an address space of the memory resource pool means: editing a discrete memory address space provided by the first memory 113 and a discrete memory address space provided by the second memory 123 into one virtual and linear continuous memory address space. The computing nodes in the computer system 100 share a resource in the memory resource pool, and access the storage space of the memory resource pool by using the global virtual address.

The computer system 100 shown in FIG. 1 is used as an example to describe the first resource manager 1111.

The memory resource owned by the first computing node 110 is a memory space (for example, a first memory space and a third memory space shown in FIG. 1) provided by the first memory 113, and the memory resource owned by the second computing node 120 is a memory space (for example, a second memory space and a fourth memory space shown in FIG. 1) provided by the second memory 123. In this case, the first resource management unit 114 is configured to obtain memory information of the first memory 113 and the second memory 123, where the memory information of the first memory 113 includes a physical address of the first memory space and a physical address of the third memory space, and the memory information of the second memory 123 includes a physical address of the second memory space and a physical address of the fourth memory space.

Optionally, the memory information of the first memory 113 further includes a size of the memory space provided by the first memory 113 (including a size of an available memory space and a size of a used memory space in the first memory 113), a physical address of the used memory space, a physical address of the available memory space in the first memory 113, and the like. The memory information of the second memory 123 further includes a size of the memory space provided by the second memory 123 (including a size of an available memory space and a size of a used memory space in the second memory 123), a physical address of the used memory space, a physical address of the available memory space in the second memory 123, and the like.

The first resource manager 1111 is further configured to connect the memory space provided by the first memory 113 and the memory space provided by the second memory 123 to form one memory space, so as to obtain a memory resource pool. The memory resource pool includes the first memory space, the second memory space, the third memory space, and the fourth memory space. Then, the memory address space of the memory resource pool is addressed to obtain the global virtual address, where the global virtual address includes a virtual address of the first memory space, a virtual address of the second memory space, a virtual address of the third memory space, and a virtual address of the fourth memory space.

The first resource manager 1111 is further configured to: construct the first correspondence, and configure the first correspondence in the first management unit 1121. The first correspondence includes a correspondence between the virtual address of the first memory space, the physical address of the first memory space, and the ID of the first computing node 110, a correspondence between the virtual address of the second memory space, the physical address of the second memory space, and the ID of the second computing node 120, a correspondence between the virtual address of the third memory space, the physical address of the third memory space, and the ID of the first computing node 110, and a correspondence between the virtual address of the fourth memory space, the physical address of the fourth memory space, and the ID of the second computing node 120.

Figure 2:
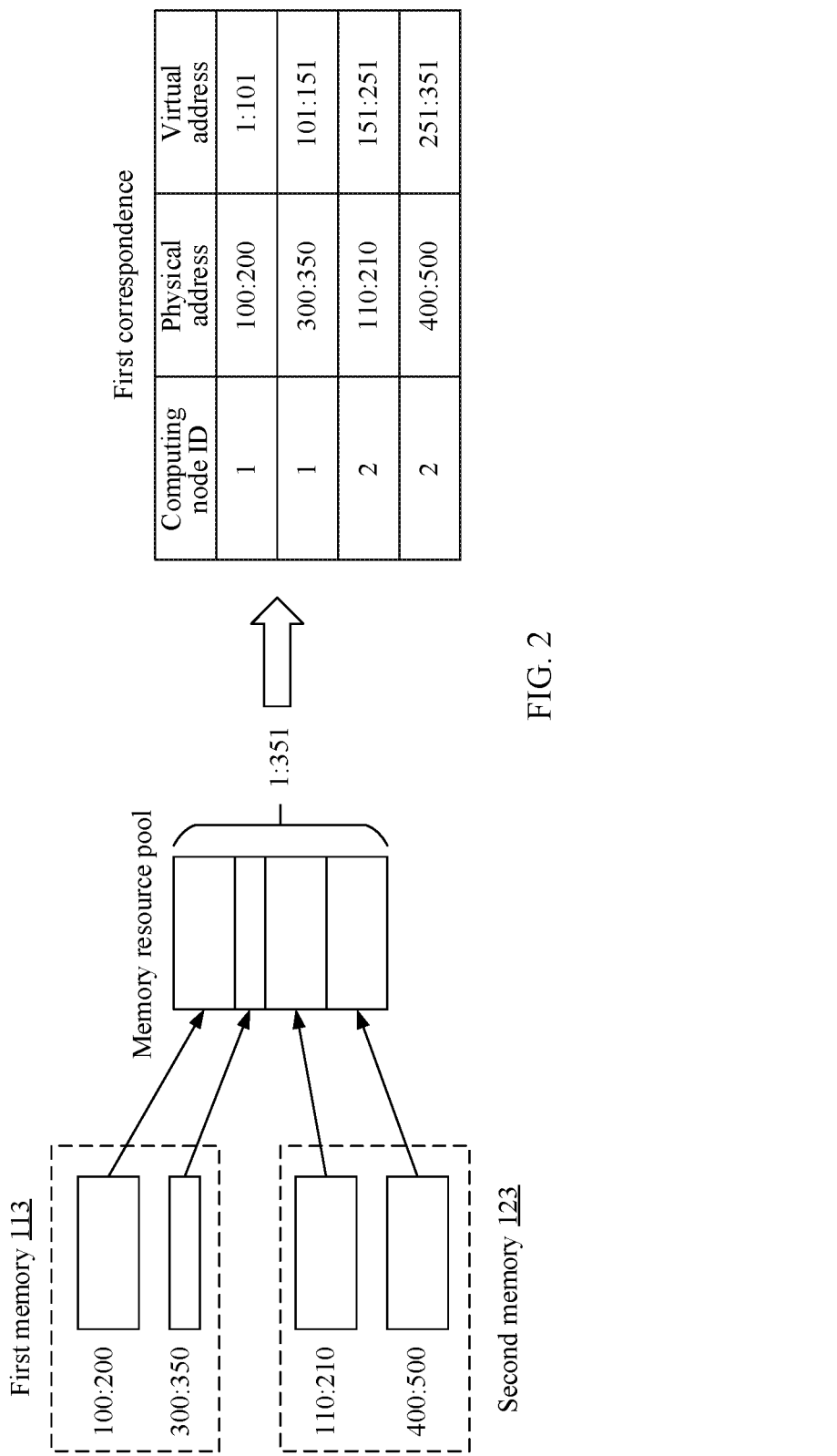
FIG. 2 is a schematic diagram of a memory resource pool and a first correspondence according to the present disclosure.

For example, assuming that the physical address of the first memory space is 100:200, the physical address of the third memory space is 300:350, the physical address of the second memory space is 110:210, and the physical address of the fourth memory space is 400:500, the first resource manager 1111 may obtain, in the foregoing manner, a memory resource pool and a first correspondence that are shown in FIG. 2.

Second Computing Node 120:

The second processor 121 may include a CPU, or may further include an ASIC or a PLD. The PLD may be a CPLD, an FPGA, a GAL, or any combination thereof.

The second device 122 is an external device on the second computing node 120. The second device 122 may be a GPU, an NPU, a DSA, a TPU, an artificial intelligence (artificial intelligence) chip, a network adapter, a DPU, or one or more integrated circuits.

Optionally, the second processor 121 and the second device 122 may be connected through a PCIe bus, may be connected through a CXL, or may be connected through a PCI, a USB, or the like. This is not specifically limited herein.

The second memory 123 is a memory in the second computing node 120, and is configured to: store data in a CPU of the second computing node 120, and exchange data with an external storage (for example, a storage of the second device 122) on the second computing node 120.

The second resource manager 1211 is a component that is in the second computing node 120 and that is configured to manage memory resources owned by all the computing nodes in the computer system 100. Optionally, the second resource manager 1211 may manage the memory resources owned by all the computing nodes in the computer system 100 in a manner similar to that of the first resource manager 1111. Details are not described herein again. The second resource manager 1211 may alternatively manage the memory resources owned by all the computing nodes in the computer system 100 in the following manner: After obtaining the global virtual address and the first correspondence, the first resource manager 1111 sends the global virtual address and the first correspondence to the second resource manager 1211, and then the second resource manager 1211 sends the first correspondence to the second management unit 1221.

In this embodiment of the present disclosure, the first computing node 110 and the second computing node 120 can communicate with each other through the first device 112 and the second device 122. Optionally, the first device 112 and the second device 122 may be connected through a wired interface or a wireless interface. The wired interface may be an Ethernet interface, a controller local area network interface, a local interconnect network (LIN) interface, or the like. The wireless interface may be a cellular network interface, a wireless local area network interface, or the like. This is not specifically limited herein.

The following uses an example in which the first computing node 110 reads data from the memory of the second computing node 120 and the first computing node 110 writes data into the memory of the second computing node 120 to describe how the computer system 100 implements cross-computing-node memory resource sharing.

(1) The First Computing Node 110 Reads Data from the Memory of the Second Computing Node 120

Figures 3, 4:
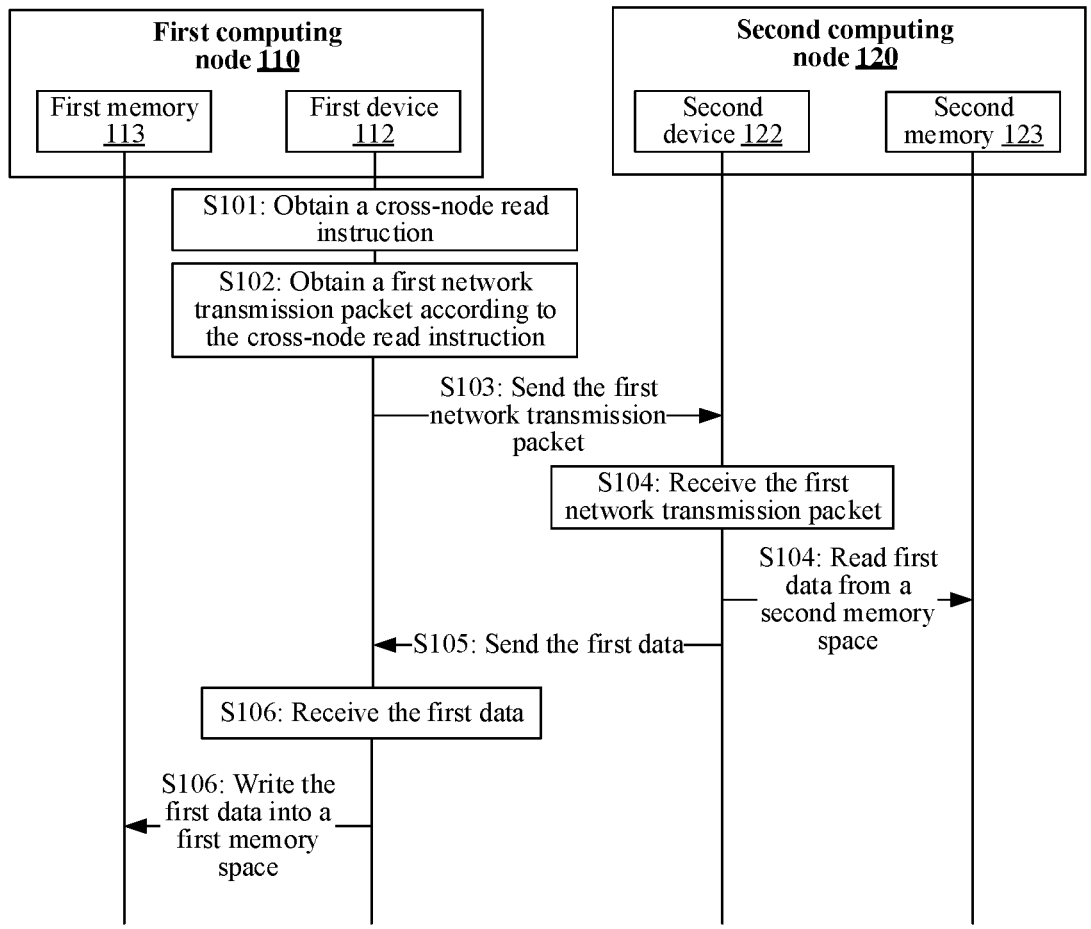
FIG. 3 is a schematic flowchart of a data transmission method according to the present disclosure.
FIG. 4 is a schematic diagram of a format of a cross-node read instruction according to the present disclosure.

FIG. 3 is a schematic flowchart of a data transmission method according to the present disclosure. The method includes but is not limited to the following steps.

S101: The first device 112 obtains a cross-node read instruction.

The cross-node read instruction instructs the first device 112 to read first data from a second memory space. In this embodiment of the present disclosure, the cross-node read instruction may be an atomic instruction, for example, an ARM® Single-copy Atomic 64-byte Store with Return (ST64BV) instruction, a Single-copy Atomic 64-byte ELO Store with Return (ST64BV0) instruction, an x86 Enqueue Command (ENQCMD) instruction, or an Enqueue Command Supervisor (ENQCMDS) instruction. An atomic instruction is a command for instructing a device to perform an atomic operation. An atomic operation is an operation that is not interrupted by a thread scheduling mechanism. Therefore, the atomic instruction may be understood as an instruction that is not interrupted once the instruction is executed until the execution is completed.

In a specific embodiment, the cross-node read instruction includes a first source address, a first destination address, and a size of the first data. The first source address is a virtual address of a memory space in which the first data is stored, and is a virtual address of the second memory space herein. The first destination address is a virtual address of a memory space into which the first data is written after the first data is read, and is a virtual address of a first memory space herein. The size of the first data may be a quantity of bytes of the first data.

It should be understood that locations of the first source address, the first destination address, and the size of the first data in the cross-node read instruction may be allocated based on an actual situation. It should be further understood that the cross-node read instruction may further include other information such as first operation description information. The first operation description information is used for describing the cross-node read instruction, so as to indicate the first device 112 that receives the instruction to read the first data from the memory space corresponding to the first source address, and write the read first data into the first destination address. FIG. 4 is used as an example. The cross-node read instruction is a 64-bit instruction. In the cross-node read instruction, bytes 0 to 7 are used for filling in the first source address, bytes 8 to 15 are used for filling in the first destination address, bytes 16 to 21 are used for filling in the size of the first data, and bytes 22 to 64 are used for filling in other information included in the cross-node read instruction, for example, the first operation description information. FIG. 4 shows an example of a format of the cross-node read instruction. The format of the cross-node read instruction may alternatively be another format. This is not specifically limited in the present disclosure.

In a possible implementation, that the first device 112 obtains a cross-node read instruction includes: The first processor 111 obtains, from a memory resource pool, the virtual address of the first memory space and the virtual address of the second memory space that correspond to the first data, generates the cross-node read instruction, and sends the cross-node read instruction to the first device 112.

In another possible implementation, that the first device 112 obtains a cross-node read instruction includes: The first device 112 obtains, from a memory resource pool, the virtual address of the first memory space and the virtual address of the second memory space that correspond to the first data, and generates the cross-node read instruction.

S102: The first device 112 obtains a first network transmission packet according to the cross-node read instruction.

Specifically, after receiving the cross-node read instruction, the first device 112 parses the cross-node read instruction to obtain the first source address and the size of the first data. Then, the first device 112 determines an ID of the second computing node 120 based on the first source address and a first correspondence stored in the first management unit 1121. Then, the first device 112 obtains the first network transmission packet according to the ID of the second computing node 120 and the cross-node read instruction. The first network transmission packet includes the first source address, the size of the first data, a first source Internet Protocol (IP) address, and a first destination IP address. The first source IP address is an IP address of the first computing node 110, and the first destination IP address is an IP address of the second computing node 120.

Optionally, the ID of the second computing node 120 may be the IP address of the second computing node 120, or may be a number indicating the second computing node 120. When the ID of the second computing node 120 is the IP address of the second computing node 120, that the first device 112 obtains the first network transmission packet according to the ID of the second computing node 120 and the cross-node read instruction includes: The first device 112 encapsulates the first source address and the size of the first data based on the IP address of the first computing node 110 and the ID of the second computing node 120, to obtain the first network transmission packet. When the ID of the second computing node 120 is the number indicating the second computing node 120, that the first device 112 obtains the first network transmission packet according to the ID of the second computing node 120 and the cross-node read instruction includes: the first device 112 determines the IP address of the second computing node 120 based on the ID of the second computing node 120, and then encapsulates the first source address and the size of the first data based on the IP address of the first computing node 110 and the IP address of the second computing node 120, to obtain the first network transmission packet.

Optionally, the first device 112 may alternatively obtain the first network transmission packet in any one of the following manners: Manner 1: The first device 112 encapsulates the first source address, the first destination address, and the size of the first data based on the IP address of the first computing node 110 and the IP address of the second computing node 120, to obtain the first network transmission packet. Manner 2: The first device 112 encapsulates the cross-node read instruction based on the IP address of the first computing node 110 and the IP address of the second computing node 120, to obtain the first network transmission packet.

S103: The first device 112 sends the first network transmission packet to the second device 122.

S104: The second device 122 receives the first network transmission packet, and reads the first data from the second memory space.

Specifically, the second device 122 receives the first network transmission packet, and then parses the first network transmission packet to obtain the first source address and the size of the first data. Then, the second device 122 determines a physical address of the second memory space based on the first source address and the first correspondence stored in the second management unit 1221. Then, the second device 122 reads the first data from the second memory space based on the physical address of the second memory space.

Optionally, the second device 122 may read the first data from the second memory space in a DMA manner. DMA is a high-speed data transmission manner. When the second device 122 reads data from the second memory space in the DMA manner, the second device 122 does not need to rely on a CPU in the second computing node 120. Therefore, in this manner, overheads of copying data by the CPU can be reduced, to improve efficiency of reading data from the second memory space by the second device 122.

S105: The second device 122 sends the first data to the first device 112.

Specifically, the second device 122 encapsulates the first data to obtain a second network transmission packet. The second network transmission packet includes the first data, a second source IP address, and a second destination IP address. The second source IP address is the IP address of the second computing node 120, and the second destination IP address is the IP address of the first computing node 110. Then, the second device 122 sends the second network transmission packet to the first device 112.

S106: The first device 112 receives the first data, and writes the first data into the first memory space.

In a possible implementation, the first device 112 receives the second network transmission packet, and parses the second network transmission packet to obtain the first data. The first device 112 further obtains the first destination address (namely, the virtual address of the first memory space) according to the cross-node read instruction, and determines a physical address of the first memory space based on the virtual address of the first memory space and the first correspondence stored in the first management unit 1121. Then, the first device 112 writes the first data into the first memory space.

In another possible implementation, the second network transmission packet further includes the virtual address of the first memory space. In this case, the first device 112 may write the first data into the first memory space in the following manner: After receiving the second network transmission packet, the first device 112 parses the second network transmission packet to obtain the first data and the virtual address of the first memory space, then determines a physical address of the first memory space based on the virtual address of the first memory space and the first correspondence stored in the first management unit 1121, and then writes the first data into the first memory space. It should be understood that, when the second network transmission packet includes the virtual address of the first memory space, the first network transmission packet may include the virtual address of the first memory space (namely, the first destination address). In this way, in S106, the second device 122 may encapsulate the first data and the virtual address of the first memory space together, to obtain the second network transmission packet including the virtual address of the first memory space.

Optionally, the first device 112 may write the first data into the first memory space in the DMA manner. In this way, a speed at which the first device 112 writes the first data into the first memory space can be improved.

S101 to S106 describe a process in which the first computing node 110 reads the data from the memory of the second computing node 120. It should be understood that a process in which the second computing node 120 reads data from the memory of the first computing node 110 is similar to the process in S101 to S106.

According to the data transmission method shown in FIG. 3, the first device 112 can read the first data from the second memory space, to implement cross-computing-node memory resource sharing in the computer system 100. In addition, when the foregoing data transmission method is used for reading the data, the first processor 111 may need to generate the cross-node read instruction and send the cross-node read instruction to the first device 112 in S101, and the first processor 111 and the second processor 121 are not required in other steps. That is, the foregoing data transmission method may be used for bypassing CPUs and operating systems in the first computing node 110 and the second computing node 120. In this way, the cross-computing-node data transmission efficiency can be improved, so as to improve memory resource sharing efficiency of the computer system 100. In addition, in a process in which the first device 112 reads the first data from the second memory space, the CPU of the second computing node 120 may perform another task. If the CPU of the first computing node 110 needs to generate the cross-node read instruction and send the cross-node read instruction to the first device 112, after the CPU of the first computing node 110 sends the cross-node read instruction to the first device 112, the CPU of the first computing node 110 may further be released to perform another task, so that a resource waste is reduced and resource utilization is improved.

(2) The First Computing Node 110 Writes Data into the Memory of the Second Computing Node 120

Figure 5:
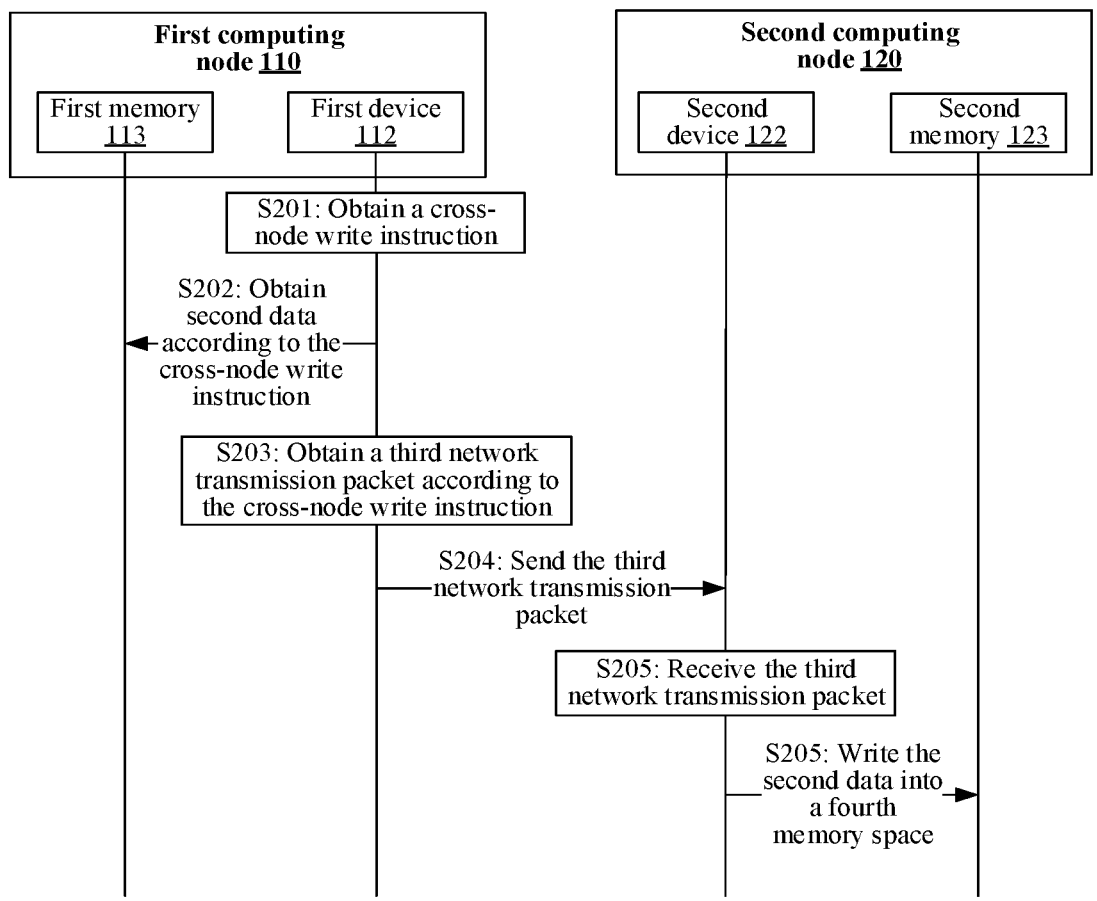
FIG. 5 is a schematic flowchart of another data transmission method according to the present disclosure.

FIG. 5 is a schematic flowchart of another data transmission method according to the present disclosure.

S201: The first device 112 obtains a cross-node write instruction.

The cross-node write instruction instructs the first device 112 to write second data into a fourth memory space. Similar to the foregoing cross-node read instruction, the cross-node write instruction may also be an atomic instruction.

In a specific embodiment, the cross-node write instruction includes a second source address, a second destination address, and a size of the second data. The second source address is a virtual address of a memory space in which the second data is stored, and is a virtual address of a third memory space herein. The second destination address is a virtual address of a memory space into which the second data is written, and is a virtual address of the fourth memory space herein. The size of the second data may be a quantity of bytes of the second data.

It should be understood that locations of the second source address, the second destination address, and the size of the second data in the cross-node write instruction may be allocated based on an actual situation. It should be further understood that the cross-node write instruction may further include second operation description information and the like. The second operation description information is used for describing the cross-node write instruction, so as to indicate the first device 112 that receives the instruction to read the second data from the memory space corresponding to the second source address, and write the read second data into the memory space corresponding to the second destination address. A specific format of the cross-node write instruction may also be the format of the cross-node read instruction shown in FIG. 4. This is not specifically limited in the present disclosure.

In a possible implementation, that the first device 112 obtains a cross-node write instruction includes: The first processor 111 obtains, from a memory resource pool, the second source address and the second destination address that correspond to the second data, generates the cross-node write instruction, and sends the cross-node write instruction to the first device 112.

In another possible implementation, that the first device 112 obtains a cross-node write instruction includes: The first device 112 obtains, from a memory resource pool, the second source address and the second destination address that correspond to the second data, and generates the cross-node write instruction.

S202: The first device 112 obtains the second data according to the cross-node write instruction.

Specifically, after receiving the cross-node write instruction, the first device 112 parses the cross-node write instruction to obtain the second source address and the size of the second data, and then determines a physical address of the third memory space based on the second source address and a first correspondence stored in the first management unit

1121. Then, the first device 112 reads the second data from the third memory space based on the size of the second data.

Optionally, the first device 112 may read the second data from the third memory space in a DMA manner. In this way, a speed at which the first device obtains the second data can be improved.

S203: The first device 112 obtains a third network transmission packet according to the cross-node write instruction.

Specifically, after receiving the cross-node write instruction, the first device 112 parses the cross-node write instruction to obtain the second destination address, and then determines an ID of the second computing node 120 based on the second destination address and the first correspondence stored in the first management unit 1121. Then, the first device 112 encapsulates the second data and the second destination address based on the ID of the second computing node 120, to obtain the third network transmission packet. The third network transmission packet includes the second data, the second destination address, a third source IP address, and a third destination IP address. The third source IP address is an IP address of the first computing node 110, and the third destination IP address is an IP address of the second computing node 120.

Optionally, the ID of the second computing node 120 may be the IP address of the second computing node 120, or may be a number indicating the second computing node 120. When the ID of the second computing node 120 is the IP address of the second computing node 120, that the first device 112 encapsulates the second data and the second destination address based on the ID of the second computing node 120, to obtain the third network transmission packet includes: The first device 112 encapsulates the second source address and the second destination address based on the IP address of the first computing node 110 and the ID of the second computing node 120, to obtain the third network transmission packet. When the ID of the second computing node 120 is the number indicating the second computing node 120, that the first device 112 encapsulates the second data and the second destination address based on the ID of the second computing node 120, to obtain the third network transmission packet includes: The first device 112 determines the IP address of the second computing node 120 based on the ID of the second computing node 120, and then encapsulates the second data and the second destination address based on the IP address of the first computing node 110 and the IP address of the second computing node 120, to obtain the third network transmission packet.

S204: The first device 112 sends the third network transmission packet to the second device 122.

S205: The second device 122 receives the third network transmission packet, and writes the second data into the fourth memory space.

Specifically, after receiving the third network transmission packet, the second device 122 parses the third network transmission packet to obtain the second data and the second destination address, and then determines a physical address of the fourth memory space based on the second destination address and the first correspondence stored in the second management unit 1221. Then, the second device 122 writes the second data into the four memory space in the DMA manner.

S201 to S205 describe a process in which the first computing node 110 writes the data into the memory of the second computing node. It should be understood that a process in which the second computing node 120 writes the data into the memory of the first computing node 110 is similar to S201 to S205.

According to the data transmission method shown in FIG. 5, the first device 112 can write the second data stored in the third memory space into the fourth memory space, to implement cross-computing-node memory resource sharing in the computer system 100. In addition, when the foregoing data transmission method is used for transmitting the data, the first processor 111 may need to generate the cross-node write instruction and send the cross-node write instruction to the first device 112 in S201, and the first processor 111 and the second processor 121 are not required in other steps. That is, the foregoing data transmission method may be used for bypassing CPUs and operating systems in the first computing node 110 and the second computing node 120. In this way, cross-computing-node data transmission efficiency can be improved, so as to improve memory resource sharing efficiency of the computer system 100. In addition, in a process in which the first device 112 writes the second data into the fourth memory space, the CPU of the second computing node 120 may perform another task. If the CPU of the first computing node 110 needs to generate the cross-node write instruction and send the cross-node write instruction to the first device 112, after the CPU of the first computing node 110 sends the cross-node write instruction to the first device 112, the CPU of the first computing node 110 may further be released to perform another task, so that a resource waste is reduced and resource utilization is improved.

The present disclosure further provides a data processing method. When the method is performed in a computer system, cross-computing-node data processing can be implemented, so that computing resource (acceleration resource) sharing is implemented in the system. The following describes the data transmission method provided in the present disclosure with reference to a computer system shown in FIG. 6.

Figure 6:
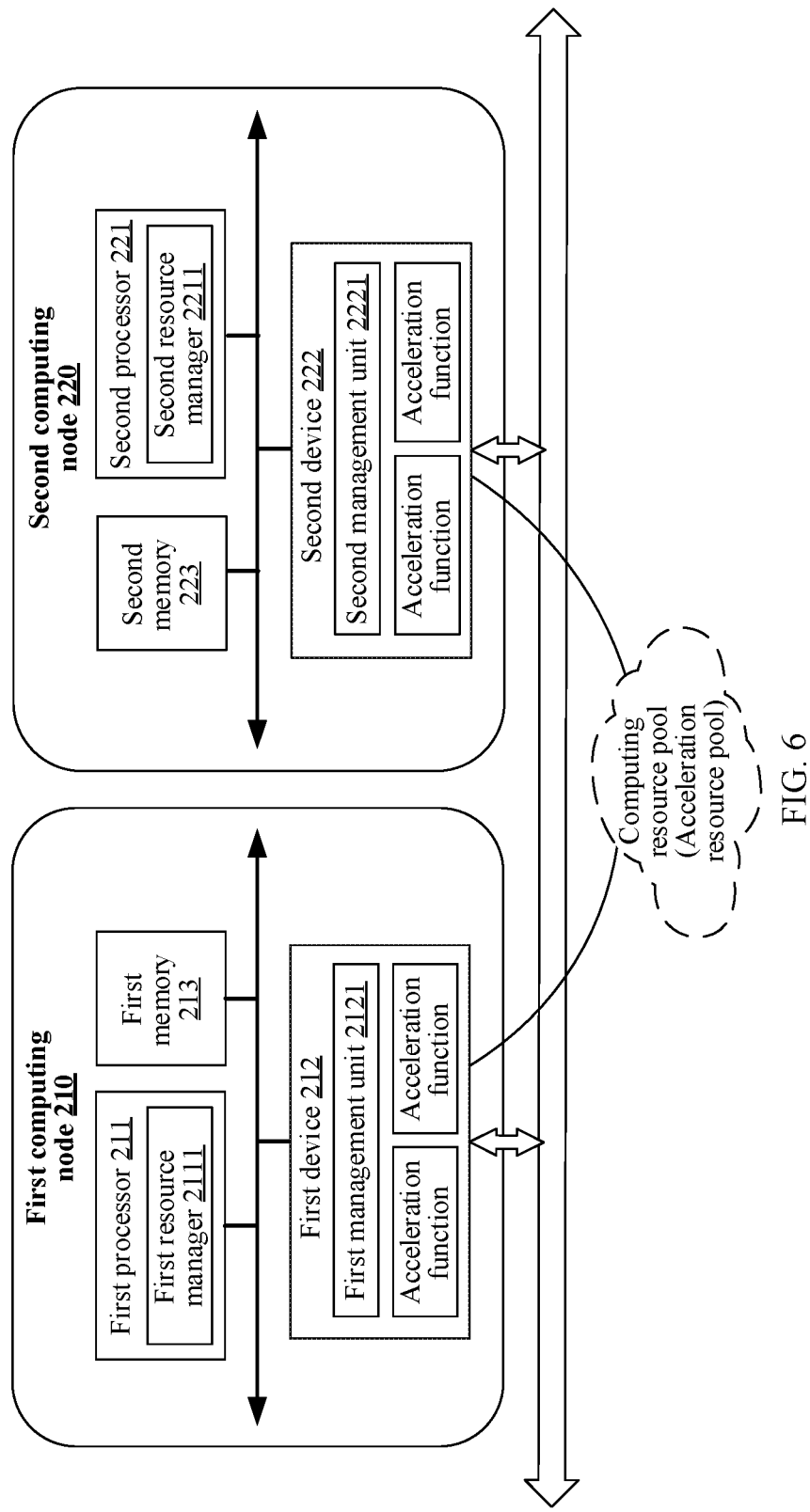
FIG. 6 is a schematic diagram of a structure of another computer system according to the present disclosure.

FIG. 6 is a schematic diagram of a structure of another computer system according to the present disclosure. The computer system 200 includes a first computing node 210 and a second computing node 220. The first computing node 210 includes a first processor 211, a first device 212, and a first memory 213. The first processor 211 includes a first resource manager 2111. The first device 212 includes a first management unit 2121. The second computing node 220 includes a second processor 221, a second device 222, and a second memory 223. The second processor 221 includes a second resource manager 2211, and the second device 222 includes a second management unit 2221. In comparison with the computer system 100 shown in FIG. 1, in the computer system 200 shown in FIG. 6:

The first device 212 and the second device 222 are external devices respectively on the first computing node 210 and the second computing node 220. Each of the first device 212 and the second device 222 has a computing capability. In this embodiment of the present disclosure, the computing capabilities of both the first device 212 and the second device 222 may be an acceleration computing capability. In this case, the first device 212 and the second device 222 are respectively acceleration devices in the first computing node 210 and the second computing node 220. Optionally, the first device 212 or the second device 222 may be a GPU, an NPU, a DSA, a TPU, an artificial intelligence (AI) chip, a network adapter, a DPU, or one or more integrated circuits.

Optionally, each of the first device 212 and the second device 222 may have one or more acceleration functions, for example, a function for accelerating a data integrity check process, a function for accelerating a data encryption and decryption process, a function for accelerating a data compression and decompression process, a function for accelerating a machine learning process, a function for accelerating a data classification process, a function for accelerating a deep learning process, and a function for accelerating floating-point computing.

Optionally, the first device 212 may alternatively not have the computing capability.

The first resource manager 2111 is a component that is in the first computing node 210 and that is configured to manage computing resources owned by all the computing nodes in the computer system 200. Specifically, the first resource manager 2111 is configured to construct a computing resource pool, where the computing resource pool includes the second device 222. Optionally, when the first device 212 also has the computing capability, the computing resource pool further includes the first device 212. The first resource manager 2111 is further configured to number acceleration devices included in all the computing nodes in the computer system 200 and an acceleration function of each acceleration device, to obtain IDs of the plurality of acceleration devices and an ID of an acceleration function corresponding to the ID of each acceleration device. The first resource manager 2111 is further configured to: construct a second correspondence, and configure the second correspondence in the first management unit 2121. The second correspondence is a correspondence between an ID of an acceleration device in the computing resource pool, an ID of an acceleration function of each acceleration device, and an ID of each computing node (namely, an ID of a computing node on which the acceleration device is located) associated with the computing resource pool.

In this embodiment of the present disclosure, the computing nodes in the computer system 200 share a resource in the computing resource pool, and can process data by using the acceleration device in the computing resource pool by using the IDs of the plurality of acceleration devices and the ID of the acceleration function corresponding to the ID of each acceleration device.

The computer system 200 shown in FIG. 6 is used as an example to describe the first resource manager 2111.

The computing resource owned by the first computing node 210 includes a computing acceleration capability provided by the first device 212. The computing resource owned by the second computing node 220 includes a computing acceleration capability provided by the second device 222. In this case, the first resource manager 2111 is configured to obtain information about the acceleration computing capabilities of the first device 212 and the second device 222. The information about the acceleration computing capability of the first device 212 includes an acceleration function of the first device 212, and the information about the acceleration computing capability of the second device 222 includes an acceleration function of the second device 222. Optionally, the information about the acceleration computing capability of the first device 212 further includes used computing power and available computing power of the first device 212, and the information about the acceleration computing capability of the second device 222 further includes used computing power and available computing power of the second device 222.

The first resource manager 2111 is further configured to: number the first device 212 and the second device 222, to obtain an ID of the first device 212 and an ID of the second device 222; and number the acceleration function of the first device 212 and the acceleration function of the second device 222, to obtain each acceleration function ID.

The first resource manager 2111 is further configured to: construct the second correspondence, and configure the second correspondence in the first management unit 2121. The second correspondence includes a correspondence between the ID of the first device 212, the ID of the acceleration function of the first device 212, and the ID of the first computing node 210, and a correspondence between the ID of the second device 222, the ID of the acceleration function of the second device 222, and the ID of the second computing node 220.

For example, the acceleration function provided by the first device 212 includes a function for accelerating a machine learning process and a function for accelerating a data encryption and decryption process, and the acceleration function provided by the second device 222 includes a function for accelerating a machine learning process and a function for accelerating a data compression and decompression process. In this case, the first resource manager 2111 may number the first device 212 as 1, number the second device 222 as 2, number the function for accelerating the machine learning process as 1, number the function for accelerating the data encryption and decryption process as 2, number the function for accelerating the data compression and decompression process as 3, number the first computing node as 1, and number the second computing node as 2, to obtain the second correspondence shown in FIG. 7.

The second resource manager 2211, in the second computing node 220, is configured to manage computing resources owned by all the computing nodes in the computer system 200. Optionally, the second resource manager 2211 may manage the memory resources owned by all the computing nodes in the computer system 200 in a manner similar to that of the first resource manager 2111. Details are not described herein again. The second resource manager 2211 may alternatively manage the computing resources owned by all the computing nodes in the computer system 200 in the following manner: The first resource manager 2111 sends related information of the computing resource pool (for example, information about a computing acceleration capability of each acceleration device in the computing resource pool) and the second correspondence to the second resource manager 2211, and then the second resource manager 2211 sends the second correspondence to the second management unit 2221.

It should be noted that functions of the first processor 211, the second processor 221, the first memory 213, and the second memory 223 in the computer system 200 are similar to functions of the first processor 111, the second processor 121, the first memory 113, and the second memory 123 in the computer system 100. A connection relationship between the first processor 211 and the first device 212, and a connection relationship between the second processor 221 and the second device 222 in the computer system 200 are respectively similar to a connection relationship between the first processor 111 and the first device 112 and a connection relationship between the second processor 121 and the second device 122 are respectively in the computer system 100.

The following uses an example in which the first computing node 210 uses the computing resource of the second computing node 220 to describe how the computer system 200 implements cross-computing-node computing resource sharing.

Figure 8:
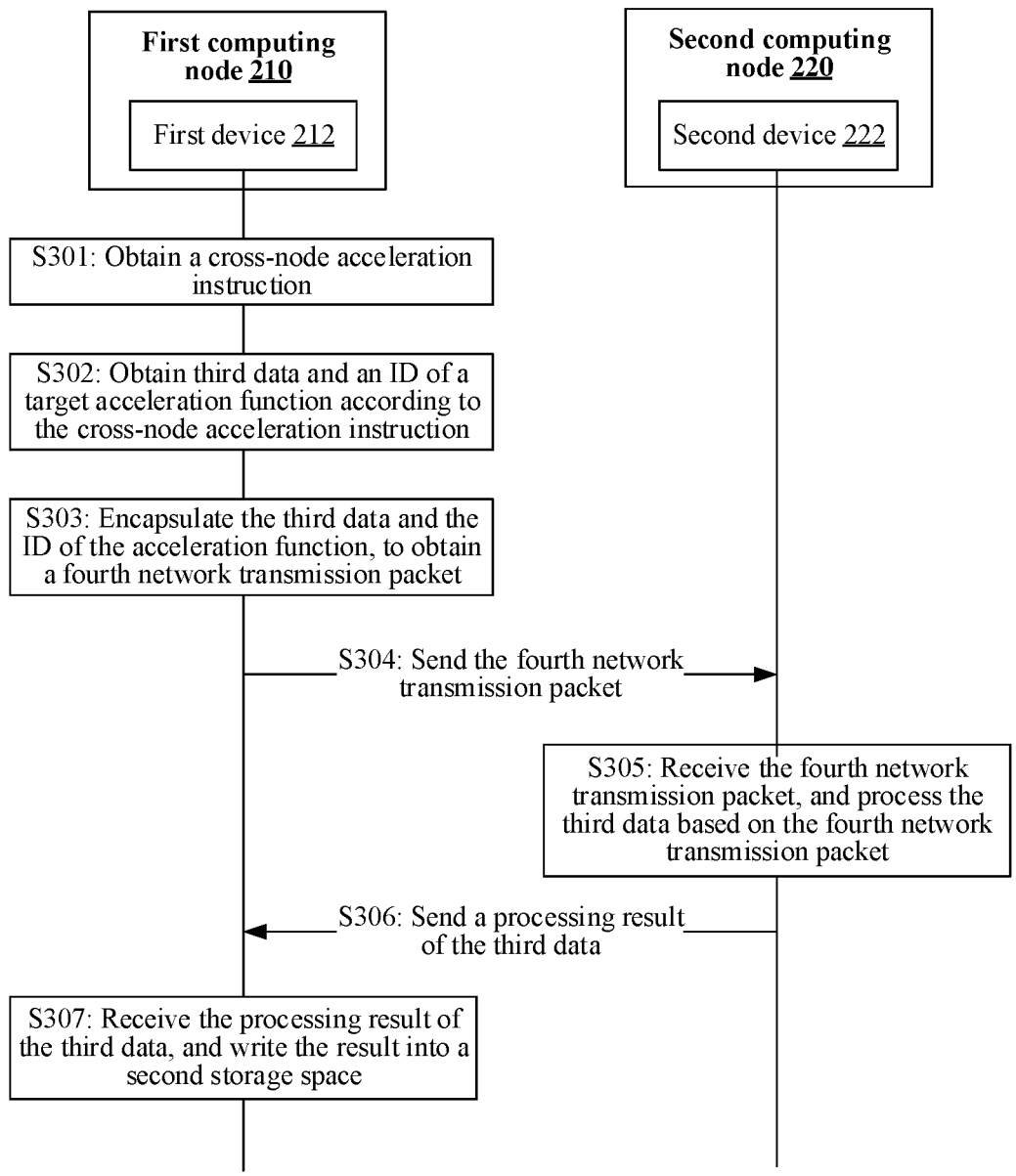
FIG. 8 is a schematic flowchart of a data processing method according to the present disclosure.

FIG. 8 is a schematic flowchart of a data processing method according to the present disclosure. The method includes but is not limited to the following steps.

S301: The first device 212 obtains a cross-node acceleration instruction.

The cross-node acceleration instruction instructs the first device 212 to process third data by using the second device 222. Similar to the cross-node read instruction and the cross-node write instruction, the cross-node acceleration instruction may also be an atomic instruction.

In a specific embodiment, the cross-node acceleration instruction includes a third source address, a third destination address, a size of the third data, an ID of a target acceleration device, and an ID of a target acceleration function. The third source address is an address of a storage space of a device in which the third data is stored, and is an address of a first storage space herein. A device storage space of the first device 212 includes the first storage space. The third destination address is an address of a device storage space into which a processing result of the third data is written, and is an address of a second storage space herein. The device storage space of the first device 212 further includes the second storage space. The size of the third data may be a quantity of bytes of the third data. The ID of the target acceleration device is an ID of an acceleration device that is used by the first device 212 and that is used for processing the third data, and is an ID of the second device herein. The ID of the target acceleration function is an ID of an acceleration function of the second device 222, and indicates the second device 222 to process the third data. For example, when the ID of the target acceleration function is an ID corresponding to a data integrity check function, the second device 222 performs a data integrity check operation on the third data. For another example, when the ID of the target acceleration function is an ID corresponding to a data encryption function, the second device 222 performs a data encryption operation on the third data.

Optionally, the cross-node acceleration instruction further includes an address of a third storage space, a device storage space of the second device 222 includes the third storage space, and the address of the third storage space is an address for storing the third data after the second device 222 receives the third data. It should be understood that locations of the third source address, the third destination address, the size of the third data, the ID of the target acceleration device, the ID of the target acceleration function, and the address of the third storage space in the cross-node acceleration instruction may be allocated based on an actual situation. FIG. 9 is used as an example. The cross-node acceleration instruction is a 64-bit instruction. In the cross-node acceleration instruction, bytes 0 to 7 are used for filling in the third source address, bytes 8 to 15 are used for filling in the third destination address, bytes 16 to 23 are used for filling in the address of the third storage space, bytes 24 to 27 are used for filling in the ID of the target acceleration device, bytes 28 to 31 are used for filling in the ID of the target acceleration function, bytes 32 to 37 are used for filling in the size of the third data, and bytes 38 to 64 are used for filling in other information included in the cross-node acceleration instruction, for example, third operation description information, where the third operation description information is used for describing the cross-node acceleration instruction, to instruct the first device 212 that receives the instruction to process the third data by using the second device 222. FIG. 9 shows an example of a format of the cross-node acceleration instruction. The format of the cross-node acceleration instruction may alternatively be another format. This is not specifically limited in the present disclosure.

In a possible implementation, that the first device 212 obtains a cross-node acceleration instruction includes: The first processor 211 obtains, from a computing resource pool, the ID of the target acceleration device and the ID of the target acceleration function that correspond to the third data, generates the cross-node acceleration instruction, and sends the cross-node acceleration instruction to the first device 112.

In another possible implementation, that the first device 212 obtains a cross-node acceleration instruction includes: The first device 212 obtains, from a computing resource pool, the ID of the target acceleration device and the ID of the target acceleration function that correspond to the third data, and generates the cross-node acceleration instruction.

S302: The first device 212 obtains the third data and the ID of the target acceleration function according to the cross-node acceleration instruction.

Specifically, after receiving the cross-node acceleration instruction, the first device 212 parses the cross-node acceleration instruction to obtain the third source address, the ID of the target acceleration device, and the ID of the target acceleration function, and then reads the third data from the first storage space.

S303: The first device 212 encapsulates the third data and the ID of the target acceleration function, to obtain a fourth network transmission packet.

Specifically, the first device 212 determines an ID of the second computing node 220 based on the ID of the target acceleration device and a second correspondence stored in the first management unit 2121. Then, the first device 212 encapsulates the third data and the ID of the target acceleration function based on the ID of the second computing node 220, to obtain the fourth network transmission packet. The fourth network transmission packet includes the third data, the ID of the target acceleration function, a fourth source IP address, and a fourth destination IP address. The fourth source IP address is an IP address of the first computing node 210, and the fourth destination IP address is an IP address of the second computing node 220.

Optionally, the ID of the second computing node 220 may be the IP address of the second computing node 220, or may be a number indicating the second computing node 220. When the ID of the second computing node 220 is the IP address of the second computing node 220, that the first device 212 encapsulates the third data and the ID of the target acceleration function based on the ID of the second computing node 220, to obtain the fourth network transmission packet includes: The first device 212 encapsulates the third data and the ID of the target acceleration function based on the IP address of the first computing node 210 and the ID of the second computing node 220, to obtain the fourth network transmission packet. When the ID of the second computing node 220 is the number indicating the second computing node 220, that the first device 212 encapsulates the third data and the ID of the target acceleration function based on the ID of the second computing node 220, to obtain the fourth network transmission packet includes: The first device 212 determines the IP address of the second computing node 220 based on the ID of the second computing node 220, and then encapsulates the third data and the ID of the target acceleration function based on the IP address of the first computing node 210 and the IP address of the second computing node 220, to obtain the fourth network transmission packet.

S304: The first device 212 sends the fourth network transmission packet to the second device 222.

S305: The second device 222 receives the fourth network transmission packet, and processes the third data based on the fourth network transmission packet.

Specifically, after receiving the fourth network transmission packet, the second device 222 parses the fourth network transmission packet, to obtain the third data and the ID of the target acceleration function, and then processes the third data based on the ID of the target acceleration function.

S306: The second device 222 sends a processing result of the third data to the first device 212.

Specifically, the second device 222 encapsulates the processing result of the third data to obtain a fifth network transmission packet. The fifth network transmission packet includes the third data, a fifth source IP address, and a fifth destination IP address. The fifth source IP address is the IP address of the second computing node 220, and the fifth destination IP address is the IP address of the first computing node 210.

S307: The first device 212 receives the processing result of the third data, and writes the result into the second storage space.

In a possible implementation, after receiving the fifth network transmission packet, the first device 212 parses the fifth network transmission packet, to obtain the processing result of the third data. The first device 212 further obtains the third destination address according to the cross-node acceleration instruction. Then, the first device 212 writes the processing result of the third data into the storage space (namely, a second storage space) corresponding to the third destination address.

In another possible implementation, the fifth network transmission packet further includes the third destination address. In this case, that the first device 212 writes the processing result of the third data into the second storage space includes: After receiving the fifth network transmission packet, the first device 212 parses the fifth network transmission packet to obtain the third data and the third destination address, and then writes the third data into the second storage space. It should be understood that when the fifth network transmission packet includes the third destination address, the fourth network transmission packet also includes the third destination address. In this way, in S306, the second device 222 may encapsulate the processing result of the third data together with the third destination address, to obtain the fifth network transmission packet.

In descriptions of the foregoing embodiment, the third data is data stored in the first device 212, and the processing result of the third data is written into the device storage space of the first device 212, to be specific, the third source address in the cross-node acceleration instruction is the address of the first storage space, and the third destination address in the cross-node acceleration instruction is the address of the second storage space. In an actual application, the third data may alternatively be data stored in the second device 222, data stored in a memory of the first computing node 210, or data stored in a memory of the second computing node 220. The processing result of the third data may alternatively be written into the memory of the first computing node 210. The following briefly describes the foregoing cases.

Case 1: When the third data is the data stored in the second device 222, and the processing result of the third data is written into the device storage space of the first device 212, the third source address in the cross-node acceleration instruction is an address of a fourth storage space, and the third destination address is still the second storage space, where the device storage space of the second device 222 includes the fourth storage space.

In this case, after obtaining the cross-node acceleration instruction, the first device 212 may process the third data by using the second device 222 by using the following steps: The first device 212 parses the cross-node acceleration instruction to obtain the ID of the second device; determines the ID of the second computing node 220 based on the ID of the second device and the second correspondence stored in the first management unit 2121; encapsulates the third source address and the ID of the target acceleration function based on the ID of the second computing node 220 to obtain a corresponding network transmission packet, and sends the network transmission packet to the second device 222; and after receiving the network transmission packet, the second device 222 obtains the third source address and the ID of the target acceleration function. Then, the second device 222 reads the third data from the fourth storage space, and performs corresponding processing on the third data based on the ID of the target acceleration function. Then, the second device 222 sends the processing result of the third data to the first device 212, and after receiving the processing result of the third data, the first device 212 writes the processing result of the third data into the second storage space.

Case 2: When the third data is the data stored in the memory of the first computing node 210, and the processing result of the third data is written into the memory of the first computing node 210, the computer system 200 may implement the foregoing cross-computing-node data processing with reference to the foregoing data transmission method. For brevity, only steps different from S301 to S307 are described herein:

(1) The third source address included in the cross-node acceleration instruction is a virtual address of a fifth memory space, and the third destination address is a virtual address of a sixth memory space. The first memory 213 includes the fifth memory space and the sixth memory space. To be specific, the cross-node acceleration instruction is obtained by the first processor 212 or the first device 222 by performing the following steps: obtaining the virtual address of the fifth memory space and the virtual address of the sixth memory space from a memory resource pool, and obtaining the ID of the second device and the ID of the target acceleration function from the computing resource pool, to generate the cross-node acceleration instruction.

It should be noted that, in the case 2, in addition to managing computing resources owned by all the computing nodes in the computer system 200, the first resource manager 2111 is further configured to manage memory resources owned by all the computing nodes in the computer system 200. For details, refer to the management manner of the first resource manager 1111. Therefore, in addition to the second correspondence, the first management unit 2121 further includes a correspondence between the virtual address of the fifth memory space, a physical address of the fifth memory space, and an ID of the first computing node 210, and a correspondence between the virtual address of the sixth memory space, a physical address of the sixth memory space, and the ID of the first computing node 210.

(2) The first device 212 obtains the third data by using the following steps: After obtaining the cross-node acceleration instruction, the first device 212 parses the cross-node acceleration instruction to obtain the third source address, and then reads the third data from the fifth memory space based on the third source address and a correspondence that is between the virtual address of the fifth memory space and the physical address of the fifth memory space and that is stored in the first management unit 2121.

(3) After obtaining the processing result of the third data, the first device 212 writes the third data into the third destination address by using the following steps: After obtaining the processing result of the third data, the first device 212 writes the processing result of the third data into the sixth memory space based on the third destination address and a correspondence that is between the virtual address of the sixth memory space and the physical address of the sixth memory space and that is stored in the first management unit 2121.

It should be understood that, when the third data is the data stored in the second device 222, and the processing result of the third data is written into the memory of the first computing node 210, or the third data is the data stored in the memory of the second computing node 220, and the processing result of the third data is written into the device storage space of the first device 212, or the third data is the data stored in the memory of the second computing node 220, and the processing result of the third data is written into the memory of the first computing node 210, a method for processing the third data by the first device 212 by using the second device 222 may also be combined with the data transmission method provided in the present disclosure. For a specific process, refer to the method described in the case 2. In addition, the method is adaptively modified.

The foregoing embodiment describes a process in which the first computing node 210 processes the data by using the acceleration device of the second computing node 120. It should be understood that a process in which the second computing node 220 processes data by using an acceleration device of the first computing node 210 is similar to the process described in the foregoing embodiment.

According to the foregoing data processing method, the first device 212 can process the third data by using the second device 222, to implement cross-computing-node computing resource sharing in the computer system 200. In addition, when the foregoing data processing method is used for processing the data, the first processor 211 may need to generate the cross-node write instruction and send the cross-node write instruction to the first device 212 in S301, and the first processor 211 and the second processor 221 are not required in other steps. That is, the foregoing data processing method may be used for bypassing CPUs and operating systems in the first computing node 210 and the second computing node 220. In this way, cross-computing-node data processing efficiency can be improved, so as to improve computing resource sharing efficiency of the computer system 200. In addition, in a process in which the first device 212 processes the third data by using the second device 222, the CPU of the second computing node 220 may perform another task. If the CPU of the first computing node 210 needs to generate the cross-node acceleration instruction and send the cross-node acceleration instruction to the first device 212, after the CPU of the first computing node 210 sends the cross-node acceleration instruction to the first device 212, the CPU of the first computing node 210 may further be released to perform another task, so that a resource waste is reduced and resource utilization is improved.

The foregoing describes in detail the data transmission method and the data processing method provided in the present disclosure with reference to FIG. 1 to FIG. 9. The following describes a system for performing the data transmission method and the data processing method.

The present disclosure further provides a computer system. As shown in FIG. 1, the computer system 100 may include the first computing node 110 and the second computing node 120, where the first computing node 110 may include the first device 112 and the first memory 113, and the second computing node 120 may include the second device 122. Optionally, the first computing node 110 may further include the first processor 111.

The first device 112 is configured to perform S101 to S103, S106, and S201 to S204, and the second device 122 is configured to perform S104, S105, and S205.

Optionally, when the first computing node 110 includes the first processor 111, the first processor 111 is configured to: address an address space of a memory resource pool of the computer system 100, to obtain a global virtual address of the memory resource pool, and construct a first correspondence. The first processor 111 is further configured to perform the step of generating a cross-node read instruction and sending the cross-node read instruction to the first device 112 in S101. The first processor 111 may be further configured to perform the step of generating a cross-node write instruction and sending the cross-node write instruction to the first device 112 in S201.

The present disclosure further provides a computer system. As shown in FIG. 6, the computer system 200 may include the first computing node 210 and the second computing node 220, where the first computing node 210 may include the first device 212, and the second computing node 220 may include the second device 222. Optionally, the first computing node 110 may further include the first processor 211.

The first device 212 is configured to perform S301 to S304, S307, and the steps performed by the first device 212 in the case 1 and the case 2. The second device 222 is configured to perform S305 and S306, and the steps performed by the second device 222 in the case 1 and the case 2.

Optionally, when the first computing node 210 includes the first processor 211, the first processor 211 is configured to: number acceleration devices in a computing resource pool of the computer system 200 and an acceleration function of each acceleration device, to obtain IDs of the plurality of acceleration device and an ID of an acceleration function corresponding to the ID of each acceleration device, and construct a second correspondence. The first processor 211 is further configured to perform the step of generating a cross-node acceleration instruction and sending the cross-node acceleration instruction to the first device 212 in S301.

The present disclosure further provides a computer-readable storage medium. The computer-readable storage medium stores a first computer instruction and a second computer instruction. The first computer instruction and the second computer instruction respectively run on a first computing node (for example, the first computing node 110 shown in FIG. 1 or the first computing node 210 shown in FIG. 6) and a second computing node (for example, the second computing node 120 shown in FIG. 1 or the second computing node 220 shown in FIG. 6), to implement data transmission between the first computing node 110 and the second computing node 120 and data processing between the first computing node 210 and the second computing node 220 described in the foregoing method embodiments, so as to implement cross-computing-node resource (memory resource and computing resource) sharing in a computer system.

The computer node may be a general-purpose computer, a dedicated computer, a computer network, or another programmable apparatus. The computer instructions may be stored in the computer-readable storage medium or may be transmitted from one computer-readable storage medium to another computer-readable storage medium. For example, the computer instructions may be transmitted from one web site, computer, server, or data center to another website, computer, server, or data center in a wired (for example, a coaxial cable, an optical fiber, or a twisted pair wire) or wireless (for example, infrared, radio, or microwave) manner. The computer-readable storage medium may be any usable medium accessible by a computer, or a data storage device, such as a server or a data center, integrating one or more media. The usable medium may be a magnetic medium (for example, a floppy disk, a hard disk, or a magnetic tape), an optical medium (for example, an optical disc), or a semiconductor medium (for example, a solid-state drive (SSD)).

The foregoing descriptions are merely specific implementations of the present disclosure. Any variation or replacement readily figured out by a person skilled in the art based on the specific implementations provided in the present disclosure shall fall within the protection scope of this application.

What is claimed is:

1. A method, implemented by a computer system, wherein the method comprises:
   obtaining, by a first device of a first computing node of a computer system, a cross-node read instruction instructing the first device to read first data from a second memory space and comprising a first source address and a first size of a first data, wherein the cross-node read instruction is an atomic instruction that is not interrupted once the cross-node read instruction is executed until the execution is completed, wherein the first source address is a second virtual address of a second memory space of a second memory of a second computing node of the computer system, and wherein the first device stores a first correspondence between the second virtual address and an identifier (ID) of the second computing node;
   determining, by the first device, the ID of the second computing node based on the second virtual address and the first correspondence;
   obtaining, by the first device, a first network transmission packet according to the ID of the second computing node and the cross-node read instruction, wherein the first network transmission packet comprises the second virtual address and the first size of the first data;
   sending, by the first device, the first network transmission packet to a second device of the second computing node;
   receiving, by the second device, the first network transmission packet;
   reading, by the second device, the first data from the second memory space;
   sending, by the second device, the first data to the first device; and
   performing the determining, obtaining, and sending operations without an intervention from a processor of the first computing node.

2. The method of claim 1, further comprising sharing, by computing nodes in the computer system, a resource in a memory resource pool comprising a first memory of the first computing node and the second memory.

3. The method of claim 2, further comprising:
   addressing, by a first processor of the first computing node, an address space of the memory resource pool to obtain a global virtual address of the memory resource pool; and
   accessing, by the first computing node, a storage space of the memory resource pool using the global virtual address.

4. The method of claim 3, wherein obtaining, by the first device, the cross-node read instruction comprises:
   obtaining, by the first processor and from the memory resource pool, a first virtual address of a first memory space of a first memory of the first device and the second virtual address corresponding to the first data;
   generating, by the first processor, the cross-node read instruction based on the first virtual address and the second virtual address; and
   sending, by the first processor, the cross-node read instruction to the first device.

5. The method of claim 3, wherein obtaining, by the first device, the cross-node read instruction comprises:
   obtaining, by the first device and from the memory resource pool, a first virtual address of a first memory space of a first memory of the first device and the second virtual address of the second memory space corresponding to the first data; and
   generating, by the first device, the cross-node read instruction.

6. The method of claim 1, wherein the cross-node read instruction further comprises a first destination address, wherein the first destination address is a first virtual address of a first memory space of a first memory of the first device, and wherein the method further comprises:
   receiving, by the first device, the first data; and
   writing, by the first device, the first data into the first memory space based on the first virtual address.

7. The method of claim 6, wherein the first correspondence comprises a second correspondence between a global virtual address of a memory resource pool, a first physical address of a storage space of the memory resource pool, and an identifier (ID) of each computing node associated with the memory resource pool, and wherein writing, by the first device, the first data into the first memory space based on the first virtual address comprises:
   determining, by the first device, a second physical address of the first memory space based on the first correspondence and the first virtual address; and
   writing, by the first device, the first data into the first memory space in a direct memory access (DMA) manner.

8. The method of claim 7, further comprising:
   storing, by the second device, the first correspondence; and
   receiving, by the second device, the first network transmission packet, wherein reading the first data from the second memory space comprises:
      receiving, by the second device, the first network transmission packet;
      obtaining, by the second device, the second virtual address;
      determining, by the second device, a third physical address of the second memory space based on the first correspondence and the second virtual address; and
      reading, by the second device, the first data from the second memory space in the DMA manner.

9. The method of claim 7, wherein the first memory further comprises a third memory space, wherein the second memory further comprises a fourth memory space, and wherein the method further comprises:
- obtaining, by the first device, a cross-node write instruction comprising a second source address, a second destination address, and a second size of second data, wherein the second source address is a third virtual address of the third memory space, and wherein the second destination address is a fourth virtual address of the fourth memory space;
- determining, by the first device, a fourth physical address of the third memory space based on the first correspondence and the third virtual address;
- reading, by the first device, the second data from the third memory space in the DMA manner;
- determining, by the first device, a first ID of the second computing node based on the first correspondence and the fourth virtual address;
- obtaining, by the first device, a second network transmission packet according to the first ID and the cross-node write instruction, wherein the second network transmission packet comprises the fourth virtual address and the second data;
- sending, by the first device, the second network transmission packet to the second device;
- receiving, by the second device, the second network transmission packet; and
- writing, by the second device, the second data into the fourth memory space.

10. A method, implemented by a computer system, wherein the method comprises:
- obtaining, by a first device of a first computing node of the computer system, a cross-node acceleration instruction instructing the first device to read first data from a second memory space and comprising a first identifier (ID) of a second device of a second computing node of the computer system and a second ID of a target acceleration function, wherein the cross-node read instruction is an atomic instruction that is not interrupted once the cross-node read instruction is executed until the execution is completed, and wherein the first device stores a first correspondence between the first ID and a third ID of the second computing node;
- determining, by the first device, the third ID based on the first ID and the first correspondence;
- obtaining, by the first device, a network transmission packet according to the third ID and the cross-node acceleration instruction, wherein the network transmission packet comprises the second ID;
- sending, by the first device, the network transmission packet to the second device;
- performing, by the second device, corresponding processing on data based on the second ID;
- sending, by the second device, a processing result of the data to the first computing node; and
- performing the determining, obtaining, and sending operations without an intervention from a processor of the first computing node.

11. The method of claim 10, further comprising sharing, by computing nodes in the computer system, a resource in a computing resource pool, wherein the computing resource pool comprises the second device.

12. The method of claim 11, further comprising:
- numbering, by a first processor of the first computing node, acceleration devices in the computing resource pool and an acceleration function of each acceleration device, to obtain a fourth ID for each of the acceleration devices and a fifth ID of an acceleration function corresponding to the fourth ID of each acceleration device; and
- processing, by the first computing node using the fourth ID of each of the acceleration devices and the fifth ID corresponding to the fourth ID of each acceleration device, the data using the acceleration device in the computing resource pool.

13. The method of claim 12, wherein obtaining, by the first device, the cross-node acceleration instruction comprises:
- obtaining, by the first processor from the computing resource pool, the first ID and the second ID that correspond to the data;
- generating, by the first processor, based on the first ID and the second ID, the cross-node acceleration instruction; and
- sending, by the first processor, the cross-node acceleration instruction to the first device.

14. The method of claim 12, wherein obtaining, by the first device, the cross-node acceleration instruction comprises:
- obtaining, by the first device from the computing resource pool, the first ID and the second ID that correspond to the data; and
- generating, by the first device, based on the first ID and the second ID, the cross-node acceleration instruction.

15. The method of claim 10, wherein the cross-node acceleration instruction further comprises a source address of a first device storage space indicating where the data is stored, and a destination address of a second device storage space indicating where to write the processing result of the data.

16. A system comprising:
- a first computing node comprising a first device and a first memory, wherein the first memory comprises a first memory space, and wherein the first device is configured to:
  - obtain a cross-node read instruction instructing the first device to read first data from a second memory space and comprising a source address and a size of data, wherein the cross-node read instruction is an atomic instruction that is not interrupted once the cross-node read instruction is executed until the execution is completed, and wherein the source address is a virtual address of a second memory space;
  - store a first correspondence between the virtual address of the second memory space and an identifier (ID) of the second computing node;
  - determine the ID of the second computing node based on the virtual address of the second memory space and the first correspondence;
  - obtain a network transmission packet according to the ID of the second computing node and the cross-node read instruction, wherein the network transmission packet comprises the virtual address of the second memory space and the size of the data;
  - send the network transmission packet; and
  - perform the determining, obtaining, and sending operations without an intervention from a processor of the first computing node; and
- a second computing node comprising a second device and a second memory, wherein the second memory comprises the second memory space, wherein the second device is configured to:
  - receive the network transmission packet from the first device;

read the data from the second memory space; and send the data to the first device.

17. The system of claim 16, further comprising computing nodes configured to share a resource in a memory resource pool, wherein the memory resource pool comprises the first memory and the second memory.

18. The system of claim 17, wherein the first computing node further comprises a first processor configured to address an address space of the memory resource pool to obtain a global virtual address of the memory resource pool, and wherein the first computing node is configured to access, using the global virtual address, a storage space of the memory resource pool.

19. A system comprising:

a second computing node comprising a second device;

a first computing node comprising a first device, wherein the first device is configured to:

obtain a cross-node acceleration instruction instructing the first device to read first data from a second memory space and comprising a first ID of the second device and a second ID of a target acceleration function wherein the cross-node read instruction is an atomic instruction that is not interrupted once the cross-node read instruction is executed until the execution is completed;

store a correspondence between the first ID of the second device and a third ID of the second computing node;

determine the third ID of the second computing node based on the first ID of the second device and the correspondence;

obtain a network transmission packet according to the first ID of the second computing node and the cross-node acceleration instruction, wherein the network transmission packet comprises the second ID of the target acceleration function;

send the network transmission packet to the second device, and perform the determining, obtaining, and sending operations without an intervention from a processor of the first computing node, wherein the second device is configured to:

perform corresponding processing on data based on the second ID of the target acceleration function; and send a processing result of the third data to the first computing node.

20. The system of claim 19, further comprising computing nodes configured to share a resource in a computing resource pool, wherein the computing resource pool comprises the second device.

\* \* \* \* \*